Oct. 10, 1961

G. H. LEONARD 3,003,358

REMOTE CONTROL DEVICE

Filed Aug. 21, 1958

INVENTOR.
GEORGE H. LEONARD

BY Robert R. Finch

ATTORNEY.

INVENTOR.
GEORGE H. LEONARD

Oct. 10, 1961 G. H. LEONARD 3,003,358
REMOTE CONTROL DEVICE
Filed Aug. 21, 1958 8 Sheets-Sheet 3
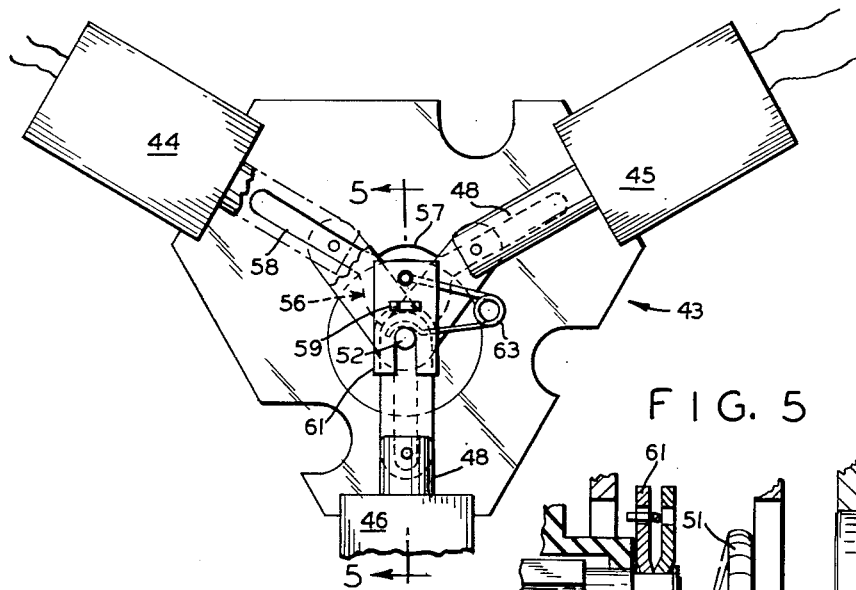
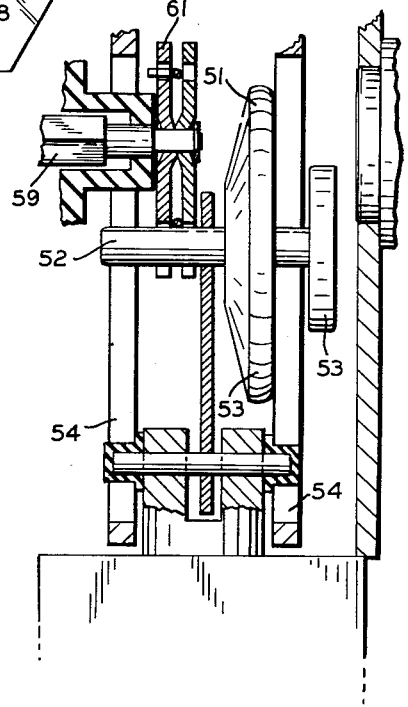
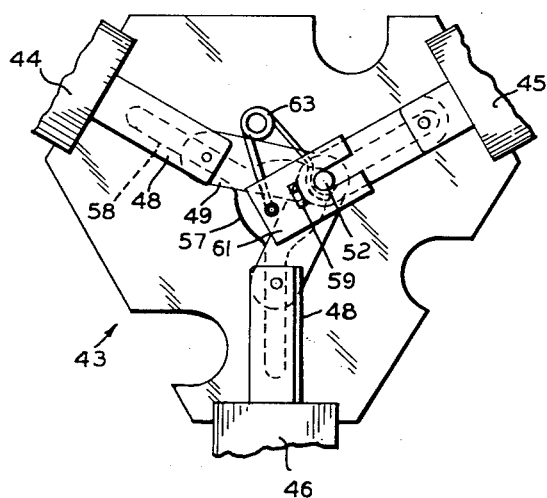
INVENTOR.
GEORGE H. LEONARD
BY *Robert R. Finch*
ATTORNEY.

Oct. 10, 1961 G. H. LEONARD 3,003,358
REMOTE CONTROL DEVICE
Filed Aug. 21, 1958 8 Sheets-Sheet 4

INVENTOR.
GEORGE H. LEONARD
BY Robert Q. Finch
ATTORNEY.

Oct. 10, 1961 G. H. LEONARD 3,003,358
REMOTE CONTROL DEVICE
Filed Aug. 21, 1958 8 Sheets-Sheet 5
FIG. 8
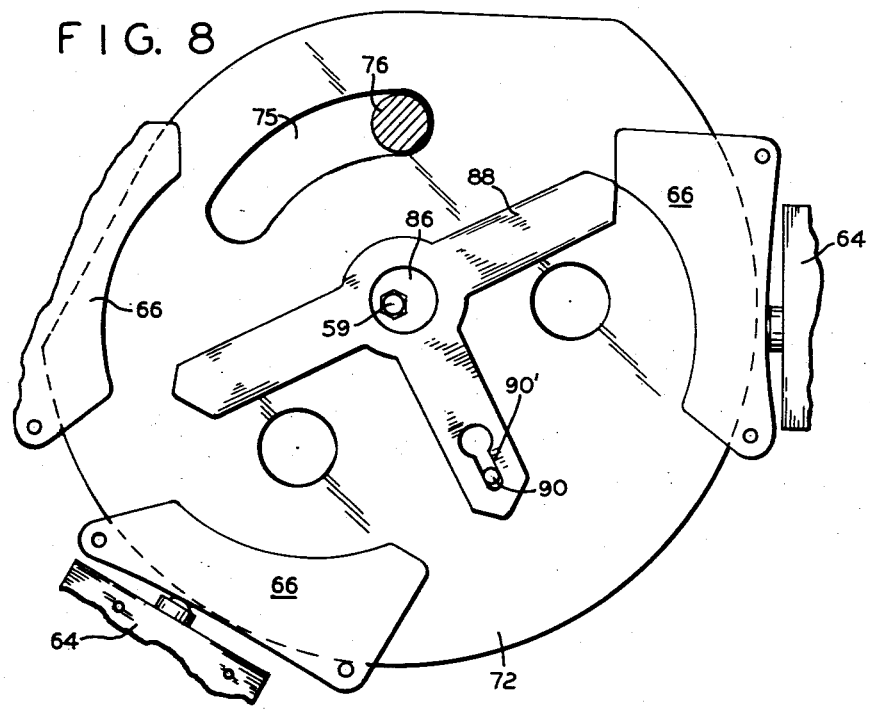
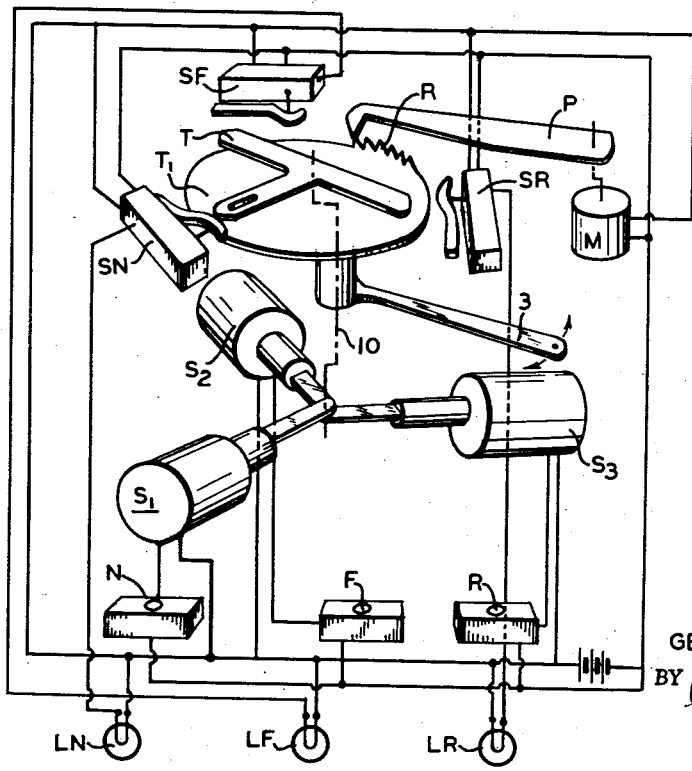
FIG. 14
INVENTOR.
GEORGE H. LEONARD
BY *Robert R. Finch*
ATTORNEY.

Oct. 10, 1961

G. H. LEONARD 3,003,358

REMOTE CONTROL DEVICE

Filed Aug. 21, 1958

INVENTOR.
GEORGE H. LEONARD
BY Robert R. Finch

ATTORNEY.

Oct. 10, 1961  G. H. LEONARD  3,003,358
REMOTE CONTROL DEVICE
Filed Aug. 21, 1958  8 Sheets-Sheet 7

INVENTOR.
GEORGE H. LEONARD
BY Robert R. Finch

ATTORNEY.

United States Patent Office 3,003,358
Patented Oct. 10, 1961

3,003,358
REMOTE CONTROL DEVICE
George H. Leonard, Darien, Conn., assignor, by direct and mesne assignments, of one-third to Arthur G. Cunnings, and one-third to Sal D'Ariano, both of New York, N.Y., and one-third to George Shongut, North Miami, Fla.
Filed Aug. 21, 1958, Ser. No. 756,424
9 Claims. (Cl. 74—116)

This invention relates generally to remote control devices and in particular to a remote controller adaptable to a variety of uses, but of particular use in power boats wherein it is desired to effect power plant or transmission control from one or more remote stations.

Heretofore, control devices of the type described have taken a variety of forms all of which have centered chiefly around two major types. One such is the direct solenoid operated type in which a selected position is attained by direct action of a solenoid on a driven member, the solenoid being actuated from a remote station. Although such devices have proven successful in some installations they are nevertheless subject to a number of disadvantages, chief among which is the shock which sudden solenoid movement imparts to the driven element. This is particularly disadvantageous when the desired motion is a shifting of the gears of a transmission.

A second common type of design heretofore employed utilizes reversible motors controlled from a remote station. In such devices the motors are actuated until a desired position is reached then operation is ceased by a cut-off mechanism. While such devices do avoid the danger of shock they are subject to a serious limitation from a control standpoint. This is so because it is virtually impossible to stop motors at a precise point, hence over-run is a common occurrence and this is overcome by arrangements which permit the motor to oscillate or hunt until the desired final position is reached.

All of such prior systems have the common disadvantage of complex circuitry and lack of a simple signalling system to sense and report the position of the driven element.

It is a primary object of the present invention to provide a remote control device enabling control from any one of a number of remote control stations yet perform its function with rapidity and ease. It is a more particular object to provide ways and means of taking advantage of the rapid movement of solenoids yet eliminating the shock of such rapid movement.

Another advantage is to provide a device which will utilize the smooth transitional motion imparted by motors yet eliminate the disadvantage of over-run and hunting.

Still another object is the provision of a simple control device of employing a uni-directional motor thus further eliminating the danger and problems inherent in control of reversible motors.

Another and more specific object is the provision of a simple yet mechanically positive control circuit which is easily serviced yet provides positive signalling of motion and position.

In order that the invention may be more readily understood and carried into effect, reference is made to the accompanying drawings and the following description thereof which is offered by way of example only.

Figure 2:
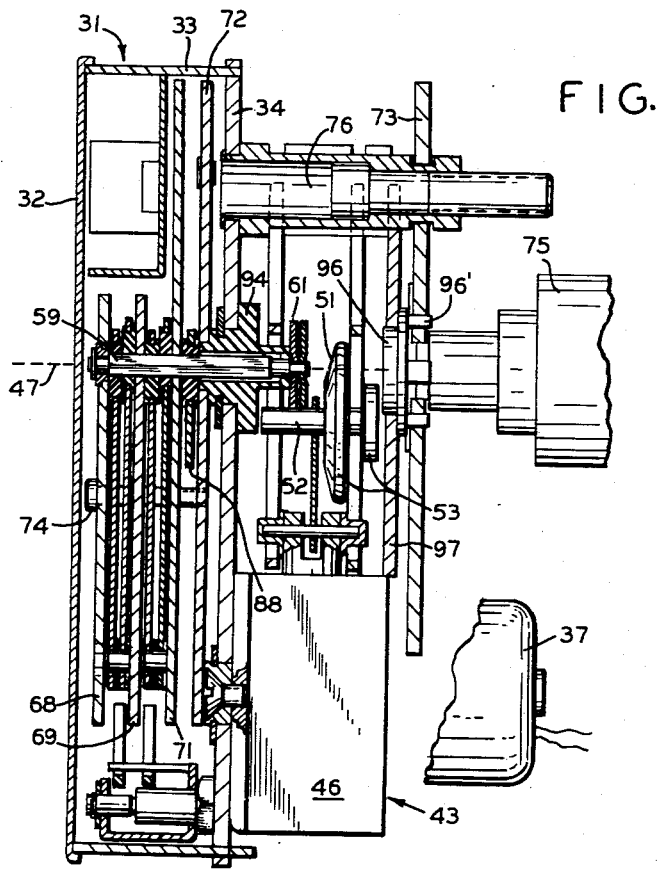
FIG. 2 is a side sectional view taken in the planes of lines 2—2 of FIG. 1, certain elements being shown in elevation and others as partially cut away, all for purposes of clarity.
Figure 2A:
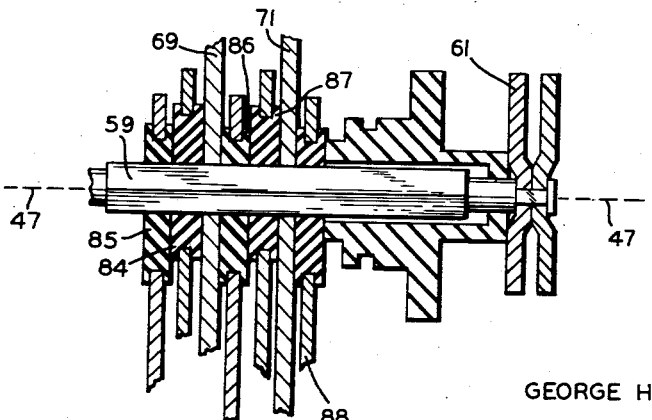

FIG. 2–A is an enlarged partial view of the assembly of FIG. 2.

FIG. 3 is a partial top plan view of a multiple solenoid assembly of the invention which selects the desired position and simultaneously initiates movement toward the selected position.

FIG. 4 is a view similar to FIG. 3 but illustrating the solenoids in a different position.

FIG. 5 is a sectional view taken in the plane of lines 5—5 of FIG. 3.

Figure 6:
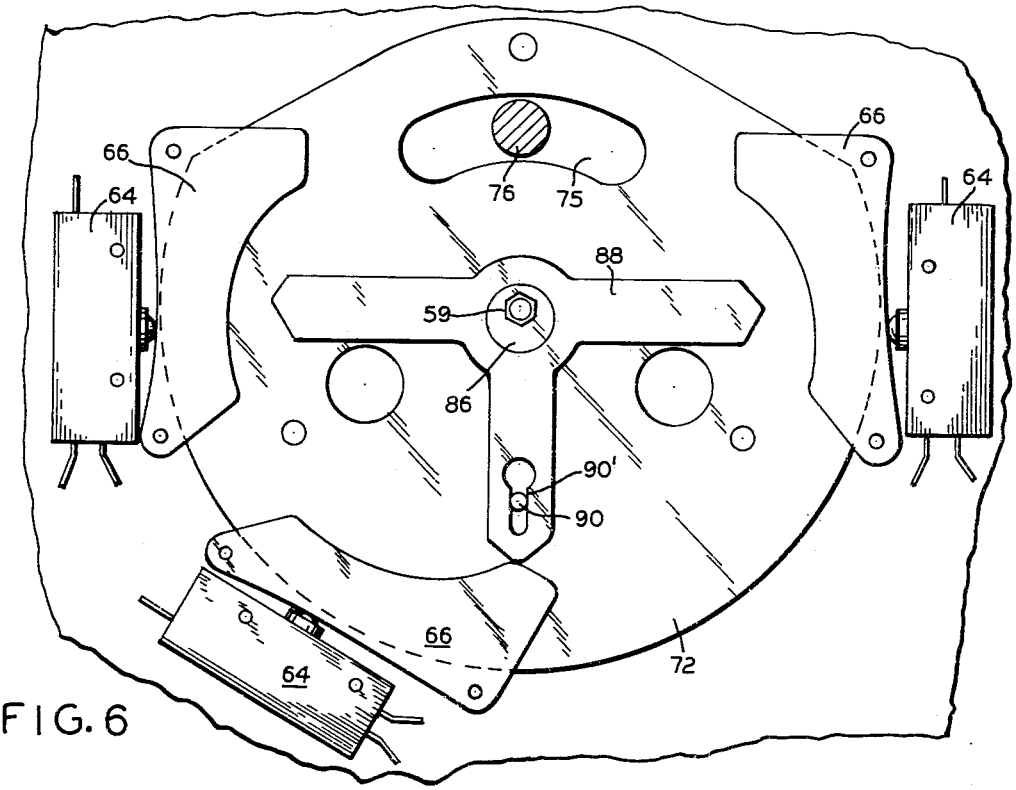

FIG. 6 is a top plan view of the motor energizing and deenergizing system.

Figure 7:
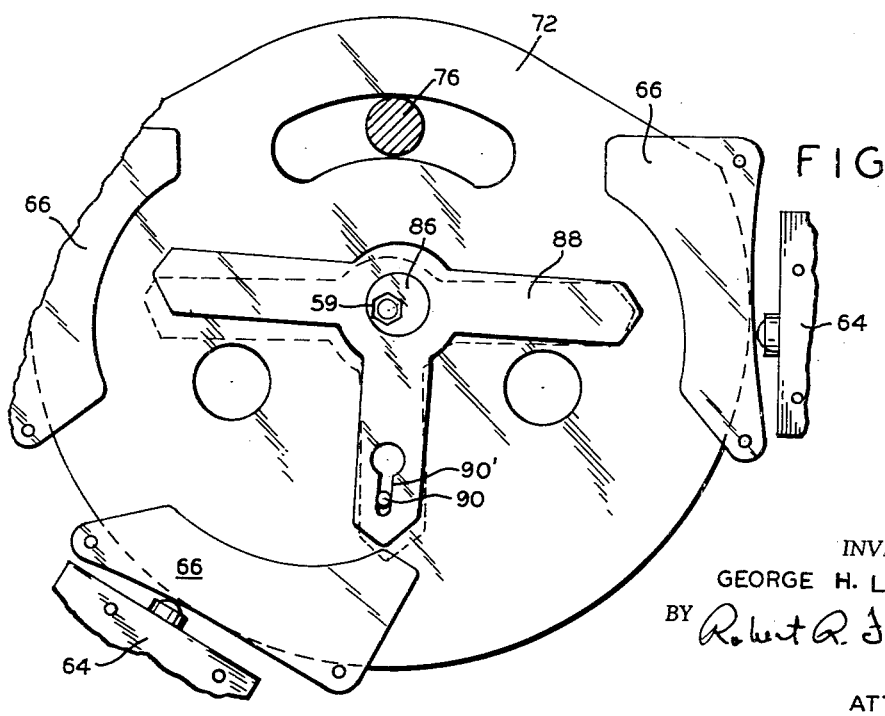

FIGS. 7 and 8 are views similar to FIG. 6, but showing elements in transitional stages to illustrate operation.

Figure 9:
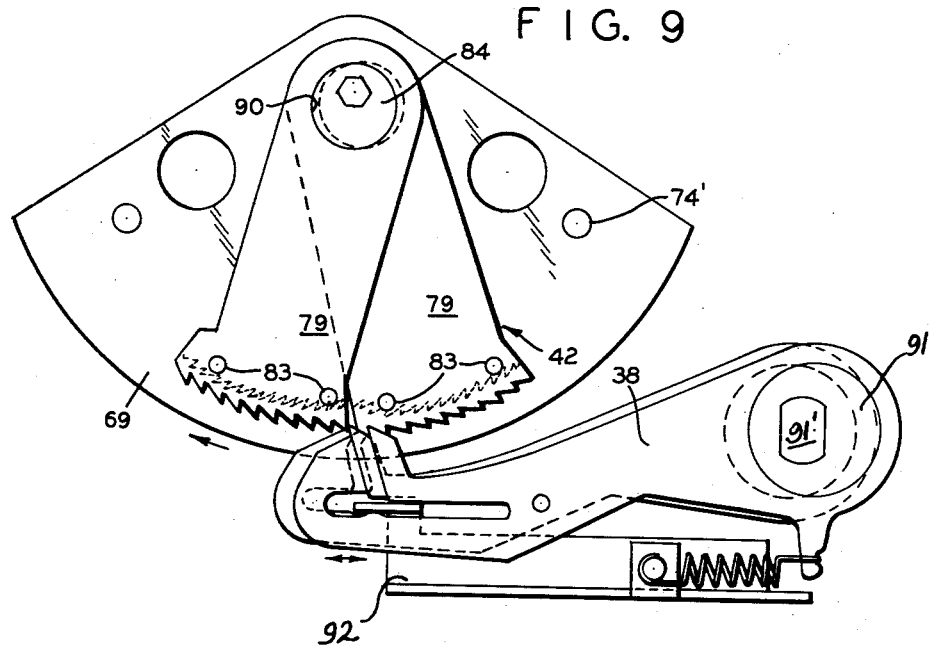

FIG. 9 is a top view of a ratchet assembly by which movement between desired positions is accomplished.

Figure 10:
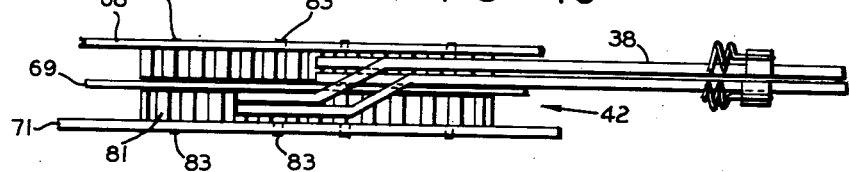

FIG. 10 is a view taken in the plane of lines 10—10 of FIG. 9.

Figure 11:
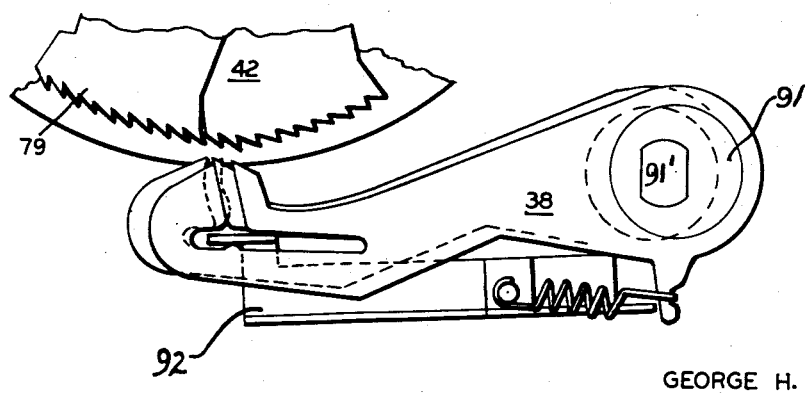

FIG. 11 is a view similar to FIG. 9 but with the pawls in a manual disconnect position.

Figure 12:
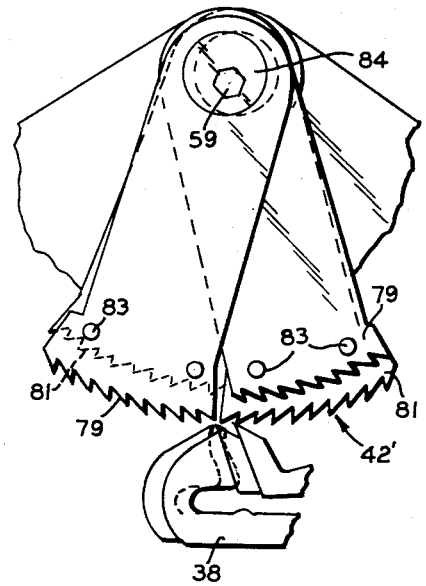
Figure 13:
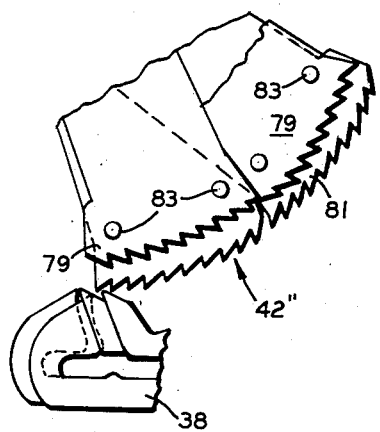

FIGS. 12 and 13 are partial plan views of the assembly illustrated in FIG. 9 showing movement of the ratchets during operation.

FIG. 14 is a simplified diagrammatic sketch showing relationship of the basic circuitry in the illustrated embodiment to the mechanical elements thereof.

Figure 15:
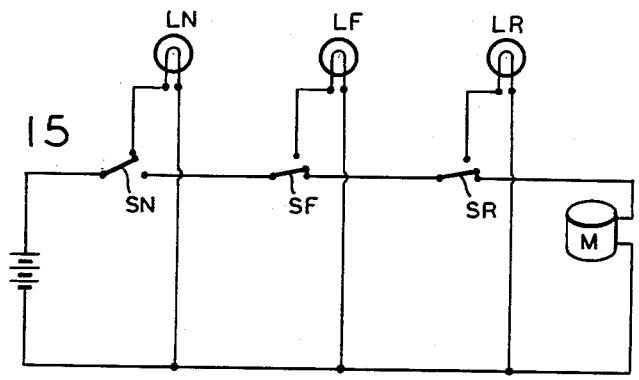
Figure 16:
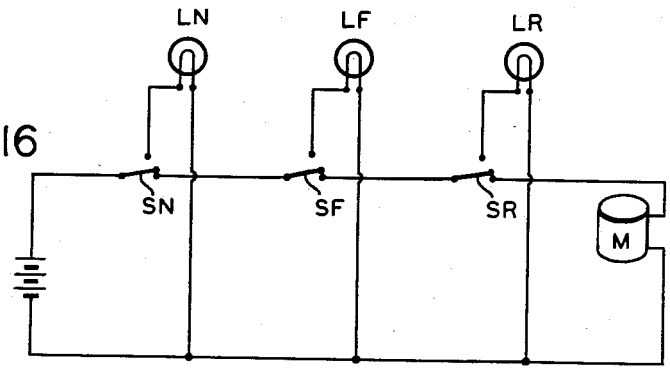
Figure 17:
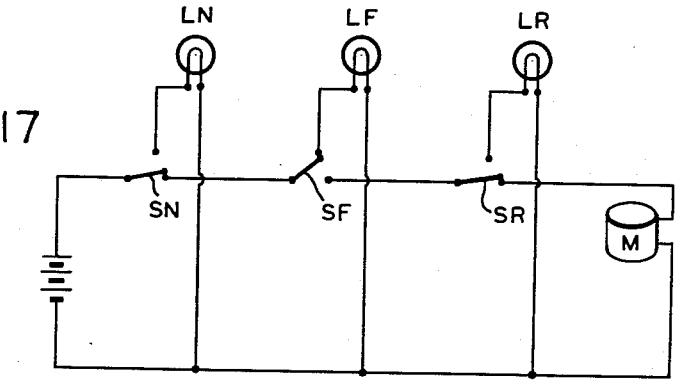

FIGS. 15, 16 and 17 are simple circuit diagrams illustrating the sequence of operation of the motor energizing and position signalling circuit.

Figure 18:
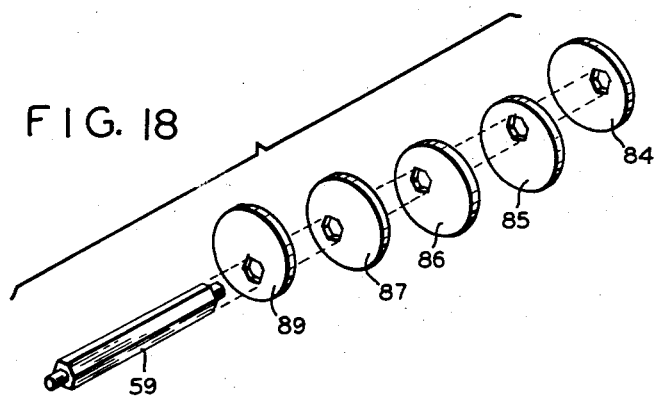

FIG. 18 is an exploded view showing positioning of the eccentrics on the shaft.

Before proceeding with a detailed description of the unit, it will be helpful to briefly describe the general method of operation. For this purpose reference is made first to the simplified schematic FIGS. 14–17 which illustrate basic functions of the elements.

Suitable control switches N (neutral), F (forward) and R (reverse) are provided which are functionally connected respectively to solenoids $S_1$, $S_2$ and $S_3$, actuating switches $S_N$, $S_F$ and $S_R$, and position signalling lights $L_N$, $L_F$ and $L_R$. The unit is shown in a neutral position with solenoid $S_1$ retracted. To change stations to forward, button F is depressed. This actuates solenoid $S_2$ and effects a partial rotation of a central shaft 10 which in turn retracts an actuating bar T from engagement with neutral position switch $S_N$. This cuts the current from the neutral position signal light $L_N$ and shunts it to the motor circuit thereby starting motor M which drives a pawl P. By means explained hereinafter, ratchets R are presented for engagement with the pawl by rotation of shaft 10. Assuming that the forward position is selected, the proper ratchets are presented and acted upon by the reciprocating pawl to turn the rotor $T_1$ upon which bar T is mounted. When the proper position is reached, one arm of bar T closes the forward switch $S_F$ thus cutting the current from the motor, shunting it instead to a forward position signal light $L_F$. Keyed to rotor $T_1$ is a work lever 3 by which motion is transmitted to any desired driven member.

The arrangement is such that a position signal light is on only when the unit is in the selected position. Moreover, any inadvertent departure from the selected position results in movement of bar T away from the switch thereby re-energizing the motor and causing the pawl to act on the ratchet to return the unit to its proper position. Thus, the simple circuitry of the invention combined with its novel apparatus provides a positive acting memory system guarding against undesired movement.

Referring now to FIGS. 1 through 13: The unit, generally designated 31 includes a top cover 32 and side walls 33 mounted on a fixed base 34. The unit is provided with a drive or power section which comprises generally a uni-directional motor 37, a dual toothed pawl 38 driven by a gear train comprising a small gear 39 mounted on the motor shaft 40 and in operative engagement with a larger gear 41 which drives pawl 38 to engage and move ratchet 42, also as more fully described below.

The above mentioned drive section is functionally connected with a position and energizing section which serves to select a position and energize the drive unit to move to the newly selected position.

Such position and energizing section comprises generally solenoids 44, 45 and 46 suitably mounted on the base plate 34 in such a manner as to be substantially equally and radially spaced about a functional center axis 47 (shown in broken line in FIGS. 2 and 2-A) of the unit having their plungers 48 facing inwardly toward such axis. In this connection, it is to be noted that the solenoids are desirably of the type that retract when energized.

The ends of solenoid plungers 48 are connected together by suitable links 49 to a common connecting member 51 which also functions as a cam follower. Such common member (FIG. 5) comprises a central shaft 52 having spaced apart flanges 53 which serve to hold the member from axial displacement. It will be noted that the solenoids are so mounted that they are free to operate between two spaced apart fixed plates 54 between which the common cam-like member 51 is positioned. Each of the fixed plates 54 has a symmetrical opening as shown in solid and dotted lines in FIGS. 3 and 4; such opening is generally designated 56. The center of this opening is aligned with the functional axis 47 of the unit. The opening is defined by three arcuate segments 57 joined together by radially extending slots 58 each of which underlies and is substantially parallel with a solenoid plunger.

The cam follower 51 is positioned with the upper portion of its central shaft 52 is engagement with the edge of opening 56 in the upper plate 54 while the lower portion of such shaft, between flanges 53, engages a similar portion of the opening in the lower fixed plate. Thus, the edge of opening 56 serves as a cam or guide for the member 51 and guides such member about the functional axis of the unit in response to movement of the solenoids.

As best shown in FIGS. 3 and 4, the arrangement is such that when a solenoid is energized it will retract its plunger and in so doing pull the other two plungers out of their respective barrels. Such movement pulls shaft 52 of cam follower member 51 into one of the radial slots 58 and, as more fully explained below, effects limited rotation of a rotatable working shaft 59.

Rotation of working shaft 59 is effected by means of a connecting link 61 fixedly mounted on the shaft 59 and extending radially therefrom. Link 61 has a bifurcated end in engagement with the central shaft 52 of the cam follower at a point radially spaced from the functional axis of the unit, thus serving to guide the cam follower unit along the arcuate cam edges 57.

In order to more positively lock the solenoids and cam follower in a selected position, the elements are so arranged that shaft 52 will be pulled partially into one of the slots 58. There is also provided a single spring member 63 positioned to urge shaft 52 away from working shaft 59 and thus hold it in one of the radially extending slots. Although only a single spring is employed, the arrangement is such that the single spring serves all three positions. This arrangement is important because it not only simplifies construction but also reduces the load on the solenoids.

A particular and important feature of the position selector of the invention is its ability to move rapidly and directly from any one position to either of the other positions without the necessity of passing through an intermediate position.

Suitable switches 64 (FIGS. 6, 7 and 8) as well as switch actuating levers 66 are provided which respond to solenoid movement, as hereinafter described, to de-energize the position signalling circuit and energize the motor circuit.

As also described below, the solenoids effect selective position changes of ratchet 42 and thus limit or control the action of pawls 38. Once a new position has been selected by a solenoid and the motor energized, actual work is effected through what may be termed a work section. Such section comprises generally a top baffle plate 68, an intermediate baffle plate 69 spaced therebelow, a bottom baffle plate 71 spaced below plate 69, and a top or first rotor 72 spaced below the bottom plate, all of which are positioned above the base plate 34. The work section also includes a bottom or second rotor 73 positioned at the bottom of the entire device. It is from this second rotor that motion is finally transmitted to the driven member.

The top, intermediate and bottom baffle plates, as well as the top and bottom rotors, are suitably spaced apart and secured together by conventional spacing posts 74 (FIG. 1) so that they can move as a unit. The baffles and rotors are provided with suitable cutout portions such as at 75 to enable movement relative to fixed structural or mounting posts 76. The ratchet assembly 42 which, as can be best seen from FIGS. 9 through 13, comprises forward ratchet members 79 and reverse ratchet members 81 is positioned between the baffle plates. There are two each of the forward and reverse ratchets mounted for relative reciprocating or sliding movement. Construction is such that all forward ratchet teeth lie in the space between plates 68 and 69 (FIG. 2) while all reverse ratchet teeth lie in the space between plates 69 and 71. The baffle plates are provided with elongated radially extending slots in which pins 83 ride thus serving to guide the ratchets during reciprocal in and out movement.

Positioning of the individual ratchet members is accomplished by four eccentrics 84–87 (FIG. 18) which are keyed, by means of a hexagonal opening, to the central working shaft 59. Thus, rotation of the working shaft and eccentrics affects radial movement of the ratchet members.

Positioning of the eccentrics is of the utmost importance since they control positioning of the ratchets preparatory to engagement by the pawl.

In the illustrated embodiment, the desired three positions span a total arc of about 60°; the forward and reverse positions being at opposite extremities of the arc and the neutral position in the middle. In this arrangement, the hexagonal shaft 59 provides a convenient method enabling proper positioning of the eccentrics.

There are three possible positions in this arrangement; both upper (forward) ratchets extended to pawl engaging position (FIG. 9), both lower (reverse) ratchets extended (FIG. 13) and one upper and one lower ratchet extended to present the neutral position (FIG. 12). Each solenoid movement turns shaft 59 through 120°, hence the eccentrics should be spaced on the shaft to present one of the three ratchet positions for each 120° of shaft rotation. This is accomplished by placing the top two eccentrics, 84 and 85, with their maximum radii defining a 60° angle and the lower two eccentrics, 86 and 87, in the same relative positions, but with their radii so spaced (180°) from those of the upper eccentrics that the desired motion occurs. Thus, when the upper ratchets are forward, the lower ratchets are retracted out of reach of the pawls. Rotation of shaft 120° in one direction toward neutral will extend one upper (forward) and one lower (reverse) ratchet sufficiently so both are engageable by the pawl (see FIG. 12). This is the neutral position and the reciprocating pawls will engage ratchets only until the unit reaches the center or neutral point. This is so because only a partial arc is presented by each the laterally adjacent upper and lower ratchets. The pawls are of course positioned and mounted to engage the presented ratchets. Since each eccentric is mounted to rotate within a suitable opening 90, in its respective ratchet member, it follows that rotation of shaft 59 effects radial movement of such ratchet members to present them for engagement by pawls 38.

Rotation of the working shaft 59 by solenoid action effects a limited preliminary motion of a T member 88 (FIGS. 2, 6, 7 and 8) positioned between the bottom baffle plate 71 and the top rotor member 72. As best shown in FIGS. 6, 7 and 8, the T member is mounted on an eccentric 86 which is in turn keyed to the rotatable shaft 59. The T member is also keyed to the bottom rotor 72 by means of a pin 90 in engagement with a slot 90' in the T which keys the T for rotation with the rotor while enabling relative radial movement of the T in response to shaft and eccentric rotation.

Reciprocation of the pawls are accomplished by means of an eccentric 91 mounted on and suitably keyed to a rotatable shaft 91' on which larger gear 41 is keyed.

As can be best seen in FIGS. 9 and 10, the pawls are constructed with two sets of engaging lugs complementary to the teeth of the upper and lower ratchets and adapted to engage the same when the proper ratchets are sufficiently extended. Thus, in the full forward position (FIG. 9) only the upper ratchets are presented for engagement with the upper pawl section, in the full reverse position (FIG. 13) only the lower ratchets are presented, in the neutral position (FIG. 12) portions of both upper and lower ratchets are presented.

A manual disconnect lever 92 is also provided and serves the additional function of limiting inward motion of the pawls. This is accomplished by means of a suitable stop arrangement on the base plate which limits inward motion of the disconnect lever. Suitable spring means 93 are also provided to insure positive engagement of the pawl with the ratchet.

Referring particularly to FIG. 2, it will be noted that the moving or work section in effect spans the position selector and energizing section. This is accomplished by means of an upper bearing member 94 and a lower bearing member 96. The upper bearing is journaled for rotation in the fixed base plate 34 while the lower bearing is journaled for rotation in a fixed sub-plate 97. The lower bearing may be keyed, as by lugs 96', to the lower rotor plate 73 and such lugs can be adapted to provide a connection to the driven member 75.

In an actual working test embodiment of the invention, the eccentrics and most other bearing parts, such as bearings 94 and 96, the common cam follower member 51, and the pin members and spacers, especially those which serve as guide bearing members, were made of nylon. A unit so constructed was tested for a considerable period of time and performed at least 40,000 position changes without showing any wear. In connection with assembly of the unit, nylon parts are sufficiently elastic to enable snapping into place. (See eccentrics 84–89 for instance), but obviously may take any desirable form.

The switching and circuitry systems have been adequately described in connection with the earlier description of FIGS. 14 through 17.

As is apparent from the preceding description, the unit is well adapted to special position selection and switching operations. It is particularly suited to shifting the transmissions of power units, but obviously can be adapted to many other uses. In this connection, the fact that position change can occur only to the extent that ratchets are available for pawl engagement completely eliminates the danger of overriding or "hunting" a position. Moreover, even if the circuitry fails so that the motor continues to run, no damage can occur because once the selected position is reached the pawls will run free of the ratchets. The memory system provided by the invention is also important because it will automatically return the unit to the desired position should inadvertent displacement occur.

In connection with the elements employed in construction of the control obviously any suitable switches and the like may be selected. For instance, switches 64 may be any commercially available snap-action single-pole double-throw switches.

Wtih reference to member 51 (FIG. 5), it should also be noted that the flanges 53, in addition to limiting axial displacement, are desirably of sufficient area to maintain member 51 in axial alignment.

It is an important feature of the invention that a momentary contact, sufficient only to allow solenoid actuation, will cause the device to move towards the selected position no matter how long the desired action takes. For instance, a .0020 second button actuation will control the .0600 second motion typical of a 60° motion.

Operation

Figure 1:
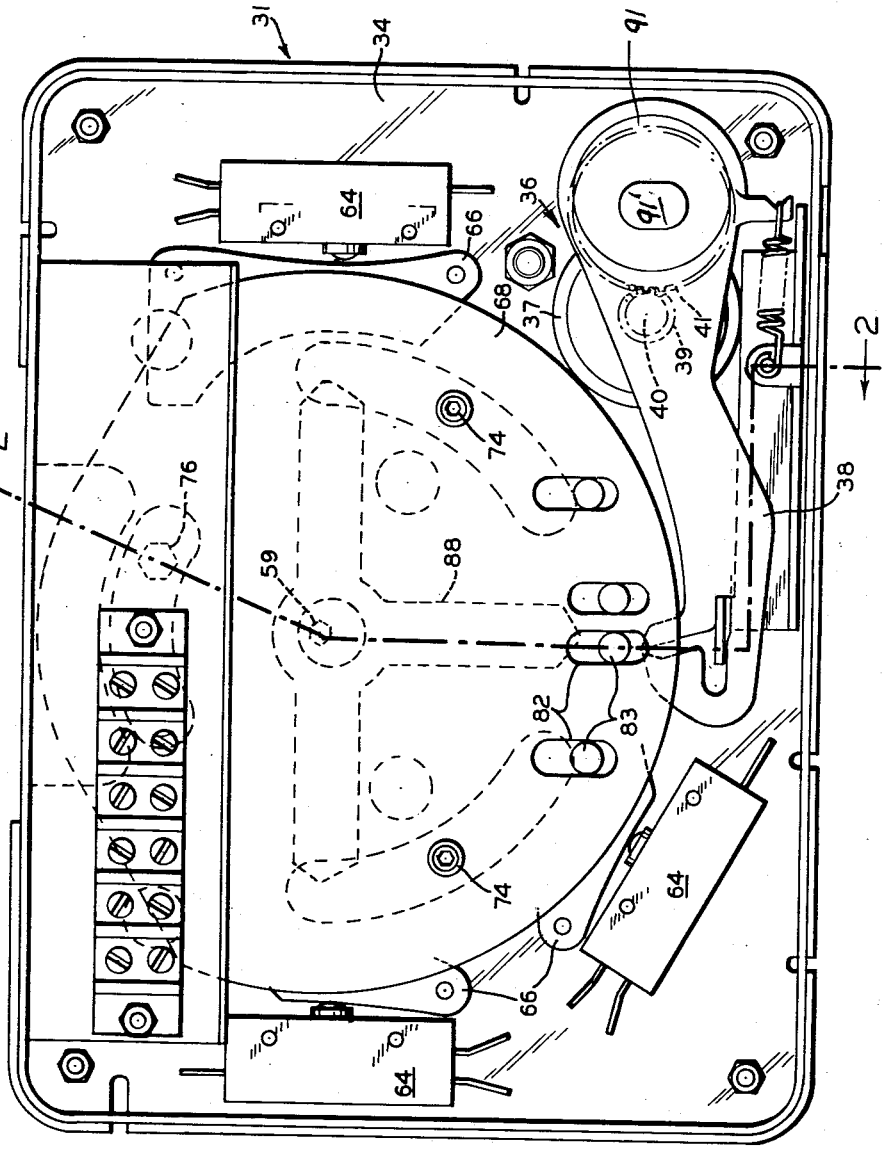
FIG. 1 is a top plan view of an assembled unit embodying the invention, the cover being removed and certain elements omitted for purposes of clarity.

Refer to the unit as illustrated in FIGS. 1 and 6 as being in a neutral position. As previously described, the motor is out of circuit (FIG. 17) and held there by means of T bar 88 acting on lever 66 which in turn holds the lower left switch 64 open, thus interrupting the motor energizing circuit.

In this position the ratchet segments are as shown in FIG. 12, with one forward ratchet 79 and one rear ratchet 81 radially extended into pawl engaging position. The bottom rotor 73, and the ultimate driven unit 75, are in position dictated by the ratchets as shown in FIGS. 1 and 6.

Should rotor 73 or unit 75 be accidentally moved from the selected position, the resulting retraction movement of T bar 88 will close the lower left switch 64 to energize the motor whereupon the pawl will engage either the extended forward or the extended reverse ratchet to return the rotor to center whereupon T bar 88 again opens lower left switch 64 to stop the motor.

To rotate rotor 73 to a new permanent position, i.e., 30° on either side of neutral, it is only necessary to energize one of the extended solenoids corresponding to the desired new position. Thus, FIG. 3, showing solenoid 46 retracted, may be taken as corresponding to the neutral position. By depressing the proper control button, solenoid 45 is retracted to pull solenoid 46 into extended position. This moves cam follower 51 about the periphery of the symmetrical opening 56 and the shaft 52 of the follower rotates to act on link member 61 thereby to effect 120° rotation of shaft 59.

Rotation of shaft 59 in this manner accomplishes two things simultaneously: First, T bar 88 is caused, by rotation of eccentric 86, to radially retract thus closing the lower left circuit to energize the motor. Second, rotation of shaft 59 effects equal rotation of eccentrics 84–87 (FIG. 17) which in turn changes positions of the ratchet segments to present for engagement both forward or both reverse ratchets as the case may be. In FIGS. 12 and 13 the changed position of the ratchets is illustrated.

Since the motor is simultaneously actuated with ratchet change, the pawl acts immediately on the ratchets to move them in a proper direction and in so doing rotates the plates to which they are pinned thus rotating the entire work unit comprising plates 68, 69 and 71 as well as rotors 72 and 73.

Rotation of the work unit moves the ultimate driven member to a new position and also rotates T bar 88 (keyed to rotor 72) so that when the limit of movement is reached the T bar acts through lever 66 to open a switch to de-energize the motor (see FIGS. 6–8).

For complete reversal from the new position, solenoid 44 is energized which retracts the T bar and reverses the ratchets from the position shown in FIG. 13.

In connection with the motion of the ratchets which is effected by the eccentrics (FIG. 18) it should be noted that the teeth of the ratchets are of sufficient depth to insure engagement by the pawls throughout the entire angular movement even though the rotation of the ratchets about the eccentrics, which it will be remembered is fixed on the shaft, does cause some radial inward or outward movement of the ratchet.

It should also be noted that driving of the ultimate driven member by the rotors is accomplished by means of tie bolts which connect all the rotors together so that when the ratchets are moved and their supporting plate in turn move about the central shaft the bottom rotor is also moved because it is fixed to the rest of the working unit as previously described.

I claim:

1. A construction for effecting movement of an ultimate driven member between selected positions; comprising a base; a shaft rotatable with respect to said base; a plurality of solenoids fixedly mounted on said base to be angularly spaced from each other and radially facing toward said shaft; switch means for separately actuating each of said solenoids; a radially extending arm on said shaft and means connecting said arm to said solenoids to thereby enable limited rotation of said shaft by actuation of a selected one of said solenoids; a pair of spaced apart superimposed overlying ratchets mounted to extend substantially radially from said shaft, the terminal end peripheries of said ratchets being formed to describe an arc, said terminal end periphery of one of said ratchets having teeth facing in one direction and the terminal end periphery of the other of said ratchets having teeth facing in the opposite direction, and said ratchets being mounted to be both rotatable about and movable radially between inward and outward positions with respect to said shaft as well as to be movable with respect to said base; an ultimate driven member movable with respect to said base and mounted to be driven by rotation of said ratchets about said shaft; a pawl and switch-controlled drive means therefor mounted on said base, said pawl being mounted to engage said peripheral teeth of a ratchet only when the latter are in a radially outward position; and means for presenting a desired ratchet for engagement by said pawl to effect movement of said driven member to a selected position, comprising motion converting means on said shaft cooperative with said ratchets to convert rotational movement of said shaft to radial movement of said ratchets to thereby effect simultaneous movement of one of said ratchets to a radially outward position and the other of said ratchets to a radially inward position upon rotation of said shaft in response to actuation of one of said solenoids and to reverse the radial positions of said ratchets in response to actuation of another of said solenoids.

2. A construction according to claim 1 in which said solenoids are three in number and are equally spaced about said shaft; each of the superimposed overlying ratchets is divided into two substantially adjacent equal sections and said motion converting means provided on said shaft is effective separately on each of the resulting for ratchet sections, said motion converting means being effective (a) by rotation of said shaft in response to actuation of a first one of said solenoids to move both sections of one of said ratchets to a radially outward position and both sections of the other of said ratchets to a radially inward position, (b) by rotation of said shaft in response to actuation of a second one of said solenoids to reverse the positions of said ratchets and (c) by rotation of said shaft in response to actuation to the third one of said solenoids to move one section of one ratchet to a radially outward position and the other section of said one ratchet to a radially inward position and to move to a radially inward position that section of the other ratchet underlying the outwardly positioned section of said one ratchet and to a radially outward position that section of said other ratchet underlying the inwardly positioned section of said one ratchet.

3. Construction according to claim 2 in which said motion-converting means comprise circular eccentrics keyed to said shaft and said ratchets are journalled on said eccentrics for rotation about said shaft and eccentrics.

4. A construction according to claim 1 in which there is provided switch closing means on the switch of said drive means for said pawl, said switch closing means being mounted to close said switch in response to actuation of any one of said solenoids to thereby energize said drive means, and switch opening means on said switch being mounted to be movable with rotation of said ratchets to open said switch in response to completion of rotation of said ratchets.

5. Remote controlling apparatus comprising a rotatably mounted shaft, solenoid means to rotate said shaft to a plurality of selected positions, means to lock said shaft against rotation in said selected positions, eccentric means operatively associated with said shaft, motor means, switch assembly means to connect said motor with a source of power, a ratchet assembly, said eccentric means simultaneously operating said switch means and moving a ratchet of said ratchet assembly into engagement with said motor means, baffle plate means driven by said ratchet, and means to connect said plate means with a device to be controlled.

6. Remote control apparatus comprising a rotatably mounted shaft, a plurality of solenoid means to selectively positionally rotate said shaft, cam plate means to lock said shaft in said selected positions, eccentric means operatively associated with said shaft, uni-direction motor means, a switch assembly operatively associated with said eccentric means to connect said motor with a source of power, a ratchet assembly operatively associated with said eccentric means, a pawl driven by said motor means, baffle plate means driven by a ratchet of said ratchet assembly, and means driven by said plate means to selectively position a device to be controlled.

7. Remote control apparatus comprising a rotatably mounted shaft, a plurality of solenoid means, means to operate each of said solenoids separately, a cam plate and cam follower means operatively associated with said solenoid means and said shaft to rotate said shaft to a plurality of selected positions, means to lock said shaft in said selected positions, eccentric means operatively associated with said shaft, a switch assembly operatively associated with said eccentric means to connect a motor means with a source of power, a ratchet assembly operatively associated with eccentric means, said ratchet assembly comprising a plurality of arcuate radially movable ratchet means, a pawl driven by said motor means, a plurality of radially slotted baffle plates overlying said ratchet means, said ratchet means being in driving engagement with said baffle plates, pin means connecting said plates with rotor means, and said rotor means being fixedly attached to a device to be controlled.

8. Remote control apparatus according to claim 7 wherein said switch assembly comprises, a rotor, means to mount said rotor for angular movement, a T member mounted on said eccentric means and overlying said rotor, a pin fixed to said rotor extending into a slot in said T to allow radial movement of said T relative to said rotor and rotate said T in conjunction with angular movement of said rotor, equiangularly spaced switch actuating levers about the periphery of said rotor operatively associated with said T, and switch means operated by said levers.

9. Remote control apparatus comprising a rotatably mounted shaft, a solenoid driven position selector unit enabling positional rotation of said shaft, eccentric means rotatable in response to rotation of said shaft, a motor unit, a motor energizing and de-energizing system operated by said eccentric means, a ratchet assembly having a plurality of radially movable arcuate ratchet means selectively movable by said eccentric means simultaneously operated with said system, a work unit connected to said ratchet assembly rotatably mounted coaxially with said shaft, said work unit positioning a device to be controlled.

References Cited in the file of this patent

UNITED STATES PATENTS

| | | |
|---|---|---|
| 2,477,599 | Hammann | Aug. 2, 1949 |
| 2,560,475 | Rehnberg et al. | July 10, 1951 |
| 2,627,006 | Lawson et al. | Jan. 27, 1953 |
| 2,680,794 | Ballou | June 8, 1954 |

FOREIGN PATENTS

| | | |
|---|---|---|
| 479,725 | Great Britain | Feb. 10, 1938 |